F. HAMACHEK.
GREEN PEA VINE HULLING MACHINE.
APPLICATION FILED AUG. 23, 1915.

1,361,051.

Patented Dec. 7, 1920.
6 SHEETS—SHEET 1.

WITNESSES

INVENTOR
Frank Hamachek.
By R. S. C. Caldwell
ATTORNEY

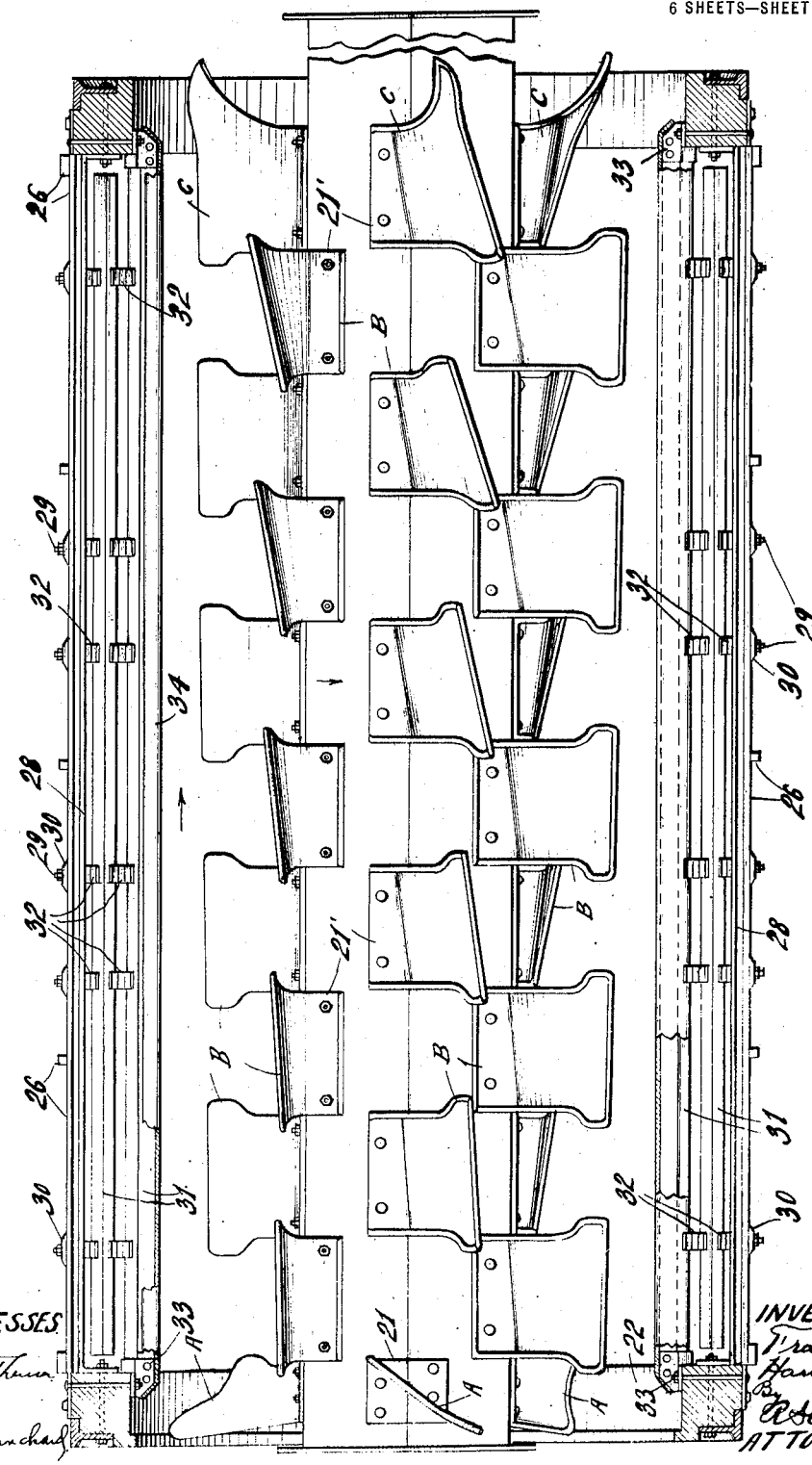

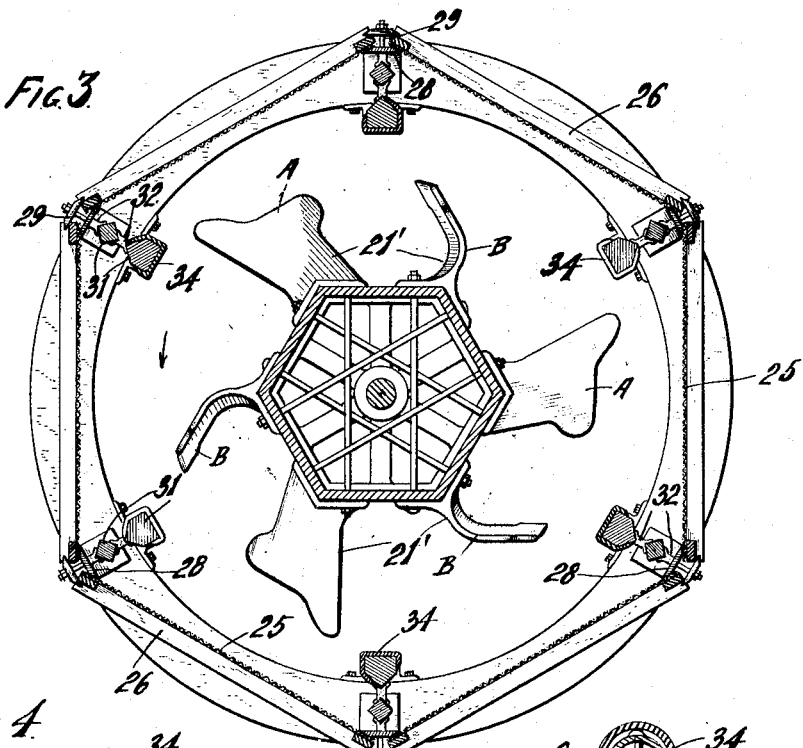
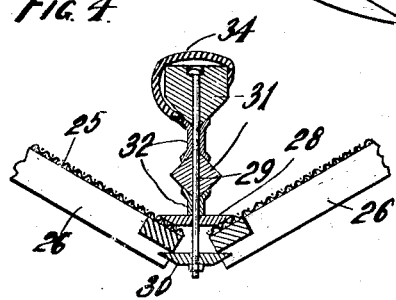
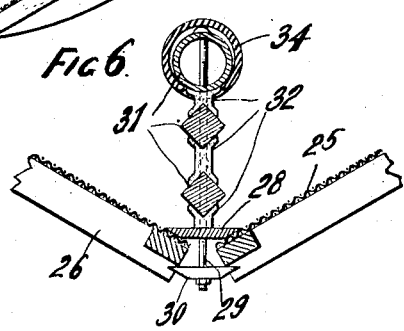
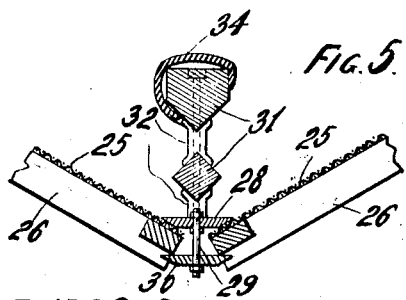
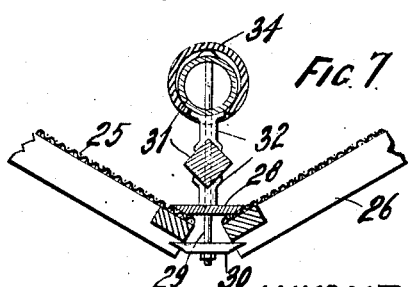

F. HAMACHEK.
GREEN PEA VINE HULLING MACHINE.
APPLICATION FILED AUG. 23, 1915.
1,361,051.
Patented Dec. 7, 1920.
6 SHEETS—SHEET 4.
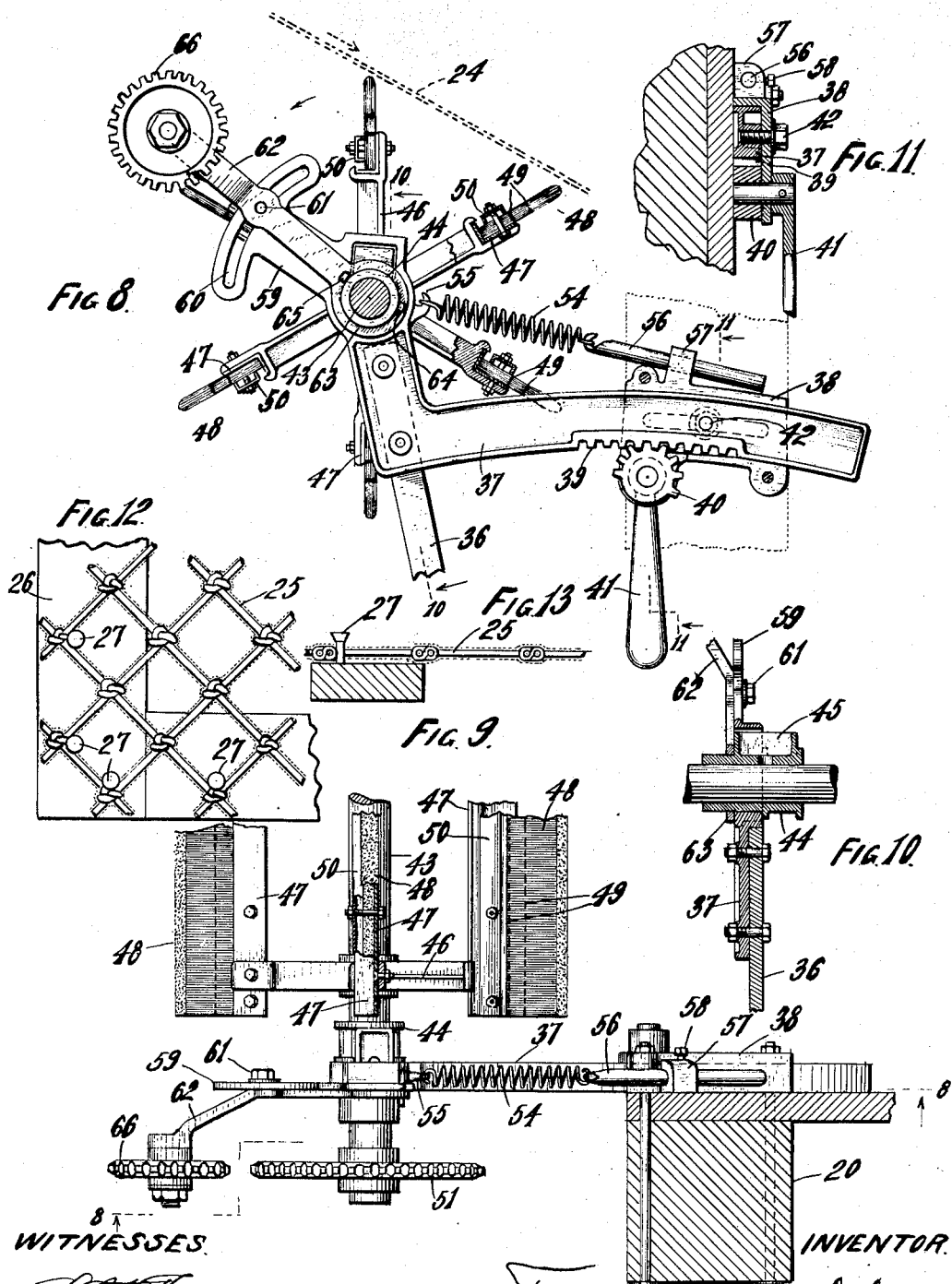

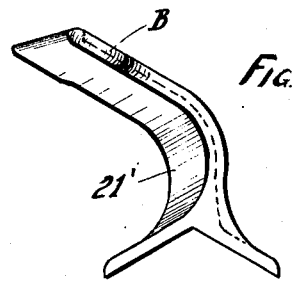
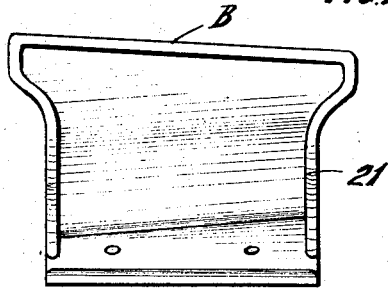
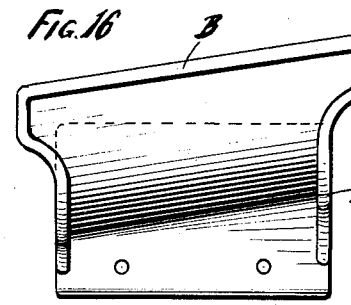
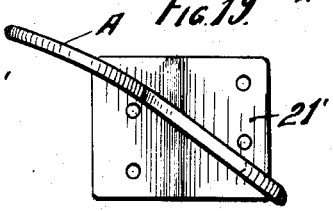
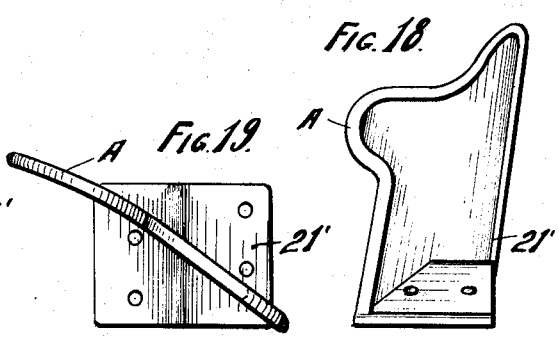
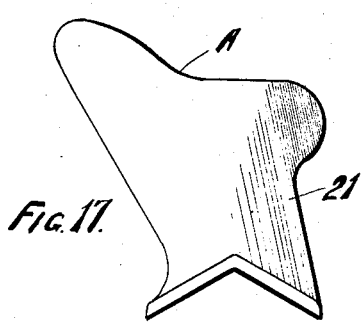
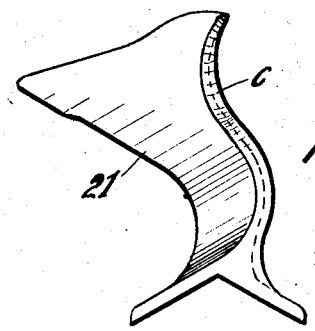
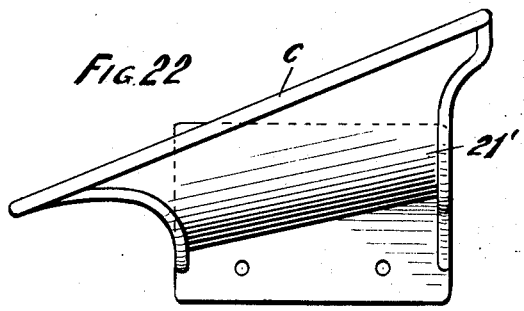
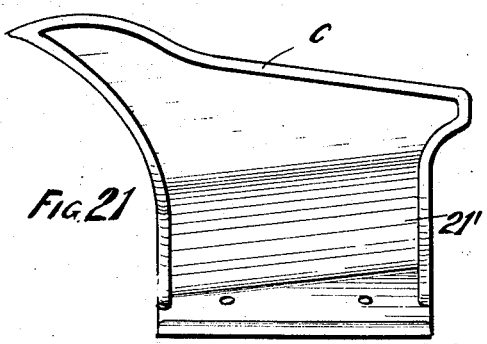

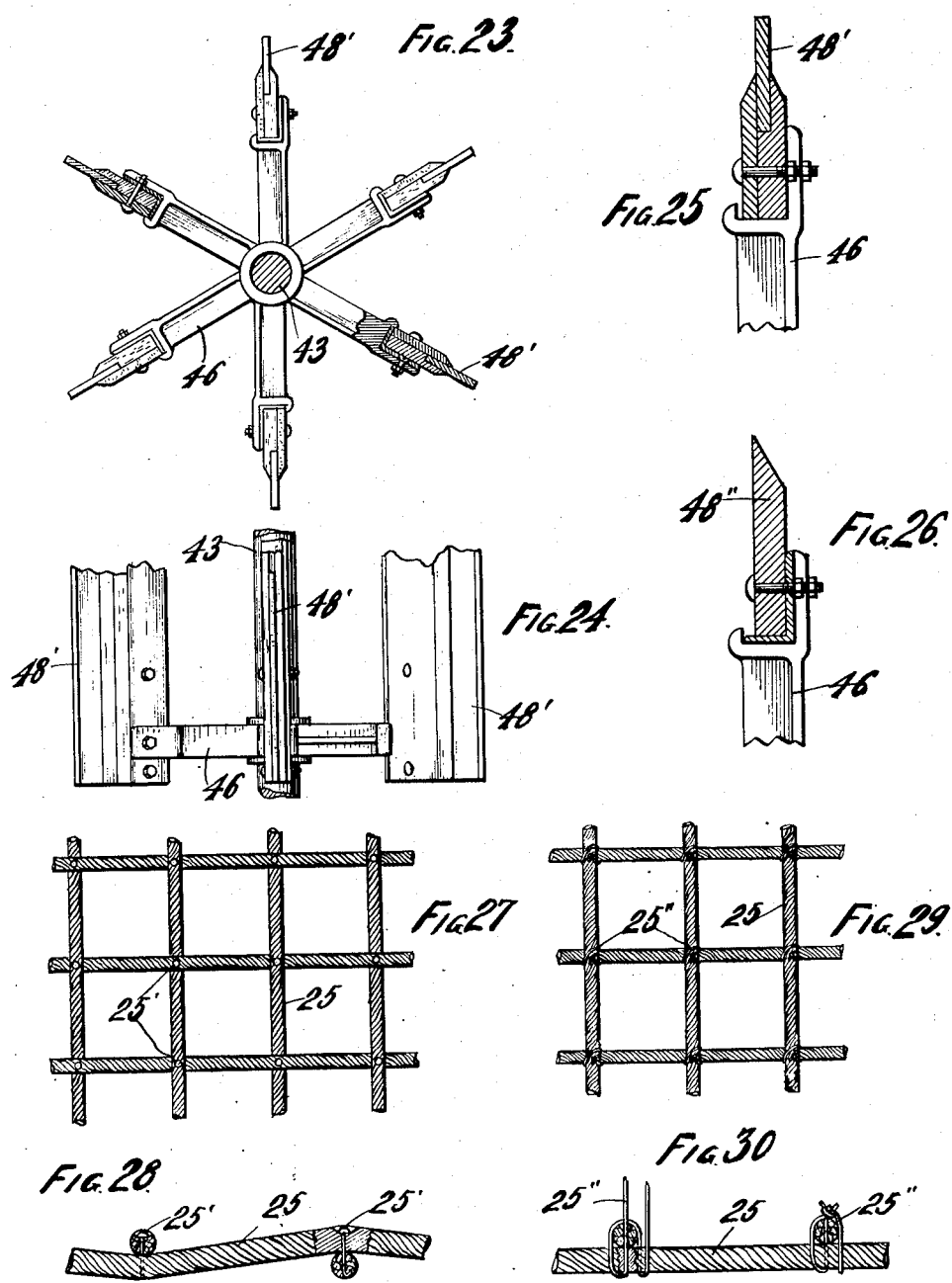

UNITED STATES PATENT OFFICE

FRANK HAMACHEK, OF KEWAUNEE, WISCONSIN.

GREEN-PEA-VINE-HULLING MACHINE.

1,361,051.  Specification of Letters Patent.  Patented Dec. 7, 1920.

Application filed August 23, 1915. Serial No. 46,798.

*To all whom it may concern:*

Be it known that I, FRANK HAMACHEK, a citizen of the United States, and resident of Kewaunee, in the county of Kewaunee and State of Wisconsin, have invented new and useful Improvements in Green-Pea-Vine-Hulling Machines, of which the following is a description, reference being had to the accompanying drawings, which are a part of this specification.

This invention relates to green pea vine hulling machines, and has for its object to obtain a more efficient operation of the machine by providing rotary hulling beaters of such a shape as to strike the vines dropped thereon a glancing blow tending to advance them toward the discharge end of the drum, and being curved forwardly to form scoops creating inwardly flowing currents of air during their rapid movements which completely overcome the tendency to fan outwardly by centrifugal force, and consequently tend to increase the surface area of the beaters contacting with the vines and pods at each blow with a corresponding increase in the effectiveness of such blows in the gentle opening of the tender pea pods so that a greater number of peas are recovered and fewer peas are damaged by bruising.

Another object of the invention is to further increase the effectiveness of the hulling beaters for this purpose by avoiding as much as possible the formation of contacting surfaces on the striking portion of the hulling beaters at substantially right angles to the line of travel, in which position they are apt to bruise the tender peas by a too severe impact and confine such portion to the area of each beater close to its base, leaving its outer portion relatively straight to form a plane impacting surface forwardly inclined to a pitch approximately parallel with one of the faces of the hexagonal inner drum to which said beater is attached.

Another object of the invention is to so construct the lifting ribs formed on the interior of the screening drum as to be capable of holding vines and unopened pods for lifting them and dropping them on the beaters, but incapable of lifting the loose peas which have been liberated from the pods so as to unnecessarily subject them to the action of the beaters.

Another object of the invention is to provide a cushioning surface on those portions of the lifting ribs against which the long trailing ends of vines caught on the hulling beaters will be whipped because of the more rapid rotation of the hulling beaters, thus further avoiding bruising of peas.

Another object of the invention is to provide the screening drum with a screening surface having a maximum sifting capacity and ample strength by forming said screening surface of a net of cord with meshes of a proper size to permit the loose peas to freely pass therethrough while preventing the passage of the pods or vines.

Another object of the invention is to so treat the netting forming the screening surface as to strengthen the material and prevent it from stretching, and to seal the knots against loosening to permit the cords to slip, while at the same time rendering the netting moisture-proof and germ-proof and more sanitary, and the surface of the netting is made smooth and free from ravelings.

Another object of this invention is to provide means for automatically cleaning adhering mud and dirt from the separating apron, said means being yieldably mounted so as to follow the up and down movements of the separating apron and being capable of withdrawal to an inoperative position when working in dry weather when there is no need for cleaning the apron.

Another object of the invention is to so mount the cleaning brush that it may be capable of greater pressure against the apron at one end than at the other, and to so mount the brush fibers in the brush frame that they will be capable of being turned from front to rear and of being reversed to prolong the life thereof.

With the above and other objects in view the invention consists in the green pea vine hulling machine as herein claimed and all equivalents.

Referring to the accompanying drawings, in which like characters of reference indicate the same parts in the different views, Figure 1 is a transverse sectional view of a green pea vine hulling machine, constructed in accordance with this invention, looking toward the discharge end thereof;

Fig. 2 is a longitudinal sectional view of the sifting drum showing the inner drum carrying the beaters in elevation;

Fig. 3 is a transverse sectional view of the sifting drum and the beater drum looking toward the feeding end thereof;

Figure 1:
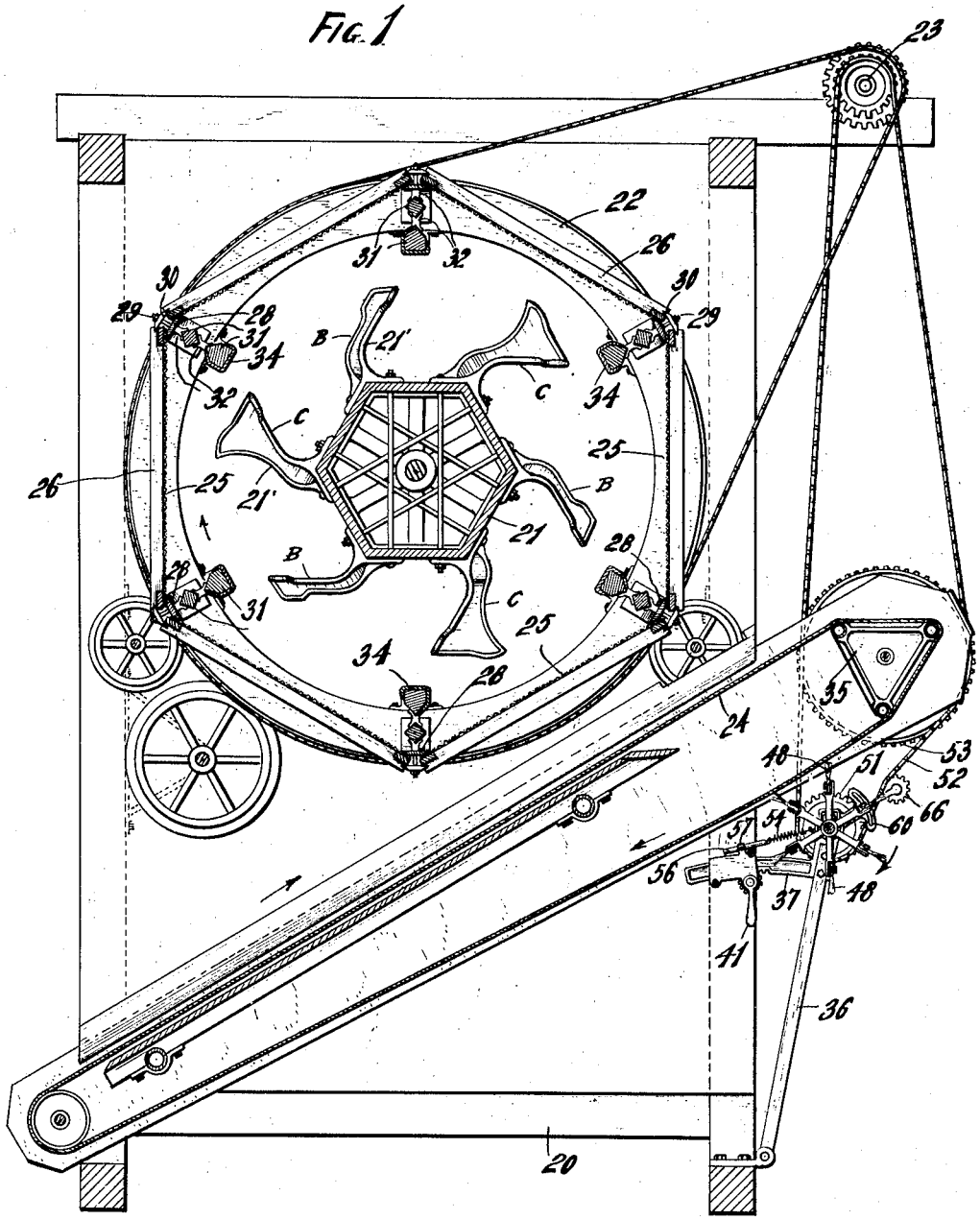

Figs. 4, 5, 6, and 7 are detail sectional views showing different forms of vine lifting ribs;

Fig. 8 is a detail view of the separator apron cleaning means on the plane of line 8—8 of Fig. 9; with parts sectioned;

Fig. 9 is a plan view thereof;

Fig. 10 is a sectional view through the bearing box of the cleaner shaft on the plane of line 10—10 of Fig. 8;

Fig. 11 is a sectional view through the cleaner guide on the plane of line 11—11 of Fig. 8;

Fig. 12 is a detail view of one corner of a screen frame with the screen fabric mounted thereon;

Fig. 13 is a sectional view through a portion of the screen fabric showing the flattened knots thereof;

Figs. 14, 15, and 16 are end, back and plan views respectively of one of the intermediate hulling beaters;

Figs. 17, 18, and 19 are end, back, and plan views respectively of one of the first series of hulling beaters; and, Figs. 20, 21, and 22 are end, back, and plan views respectively of one of the last series of hulling beaters.

In these drawings 20 represents the usual frame, in which the hexagonal beater drum 21 and the surrounding sifting drum 22 are mounted in the usual manner, and are suitably driven in the same direction, but at different speeds, from a shaft 23 which also drives an inclined separating belt 24 extending across the frame beneath the sifting drum.

The green pea vines as harvested are fed to one end of the sifting drum and are lifted by radial, longitudinally extending vine lifting ribs in the corners of the hexagonal screening surface thereof, and are dropped into the path of the faster moving beater drum, the blows struck the pea pods by said beaters serving to open the pods and liberate the peas, and the repeated lifting and falling of the vines subjected to glancing blows of the beaters, due to the beaters being positioned obliquely, causing them to be gradually fed through the sifting drum toward the discharge end thereof so that the operation is continuous. The peas released from the pods are afforded every possible opportunity for immediate escape from the sifting drum to avoid their being bruised by unnecessary further treatment in the drum, and to this end the sifting drum is covered with a screen fabric with a mesh of suitable size to permit the peas to readily pass therethrough without allowing the pea pods or vines to escape. On leaving the sifting drum the peas and the dirt, which also passes through the screens, fall upon the upwardly traveling inclined separating apron 24, where they are separated, the peas rolling down the apron because of their spherical form, and the dirt being carried upwardly on the apron.

It has been found by experience that hulling beaters positioned approximately radial with respect to the beater drum 21 act as the blades of a blower fan to create an outwardly directed current of air which tends to blow the falling vines out of the range of the beaters, so that only the extreme edges of the beaters are effective for striking the vines and the vines are kept massed and form bunches with filled pods in the interior thereof protected by the surrounding vines against the opening blows of the beaters, and consequently the peas are lost in the tailings. In my Patent No. 1,035,184 for pea huller and separator, dated August 13, 1912, I disclosed a hulling beater designed to overcome the centrifugal force tending to interfere with the proper action of the hulling beater by inclining the outer end of the hulling beater forwardly so as to form a curve or bend therein. This hulling beater has proven very satisfactory in practice, its inclined end acting as a scoop to draw air inwardly instead of fanning it outwardly, and thus drawing the falling vines inwardly to be subjected to the striking action of the greater portion of the face of the beater which thereby more effectively reaches and opens the pea pods, and without rolling the vines into punches or thick masses difficult of access to the pea pods in the interior, and resulting in the recovery of many more peas than was possible with the old form of beaters. The scoop-like action of the hulling beaters not only facilitates their engagement with the falling vines, but facilitates the beaters serving as hooks, vines from the bottom of the drum being sucked up thereby and engaged on the hooks and carried by them at a greater speed than the sifting drum so that the overhanging ends of the vines are whipped against the rear surfaces of the lifting ribs to open the pods and liberate the peas.

The beaters 21' now employed are given a greater incline at their outer ends so as to lie approximately parallel with one of the faces of the hexagonal inner drum 21 and this inclined portion is connected with the base by a curved portion which presents a deep sweeping hollow in the face of the beater which deflects the vines forwardly and outwardly as they rebound from the inclined flat portion of the beater.

By increasing the inclination of the active portion of the beater face the blow struck thereby is more indirect or glancing, the position of the beater face being oblique to the direction of fall of the vines. The rebound of the vines and pea pods after being struck by the inclined portion of the beater face is inwardly so that the vines strike against the curved surface of the beaters with force and are deflected thereby outwardly and toward the discharge end of the drum so as to more readily clear the beaters and avoid the entanglement of vines thereon.

The usual perforated sheet rubber covering for the sifting drum 22 is open to numerous objections, the first of which is its limited screening capacity on account of the inability to locate the screening openings close together without seriously weakening it. I have found that a screening surface formed of cord netting with meshes of such a size as to permit the largest peas to readily pass therethrough, though retaining the unopened peas, is more efficient than the rubber screening surface on account of the more numerous openings affording a greater opportunity for the escape of the loose peas. Such a net screen covering, however, requires particular treatment to prepare it for use in order to protect it from moisture and to maintain its shape and normal condition. I have found the proper treatment of the net to consist in mounting it on a suitable frame, which will hold it in the proper shape, and immersing it in a molten wax solution at a high temperature until the cords of the fabric, including the knotted portions thereof, are thoroughly saturated, with all of the pores or spaces between the threads of the cord filled with the wax solution. The wax also adheres to the outside of the knotted cord to form a coating therefor, and when the wax has cooled the fabric is pressed to flatten the knots, and is then brushed vigorously to remove all surplus wax and leave the fabric with a smooth coating of wax which permeates every fiber thereof and seals the knots to maintain their positions permanent, and fills the pores or interstices between the fibers so that the fabric can not stretch or lose its shape.

The fabric as thus treated is rendered permanently soft and flexible and is totally impervious to the moisture to which it is subjected in the operation of the machine, for the tender, green vines when crushed and bruised by the operation of the machine secrete a quantity of juice so that the interior of the drum is very wet. Frequently also the vines are harvested wet which adds to this moist condition.

This wax permeated knotted cord netting is also germ and vermin proof, is less liable to wear because of its smooth waxed surface, is strengthened and the tendency to unravel at the ends of the cord is prevented, while the knots are capable of being flattened to avoid their forming objectionable projections liable to bruise the peas.

I do not wish to give the impression that the woven net or seines must be used or that a wax sealing solution is the only kind that might give satisfactory results in one or more of the particulars mentioned, as any waterproof solution or process, even painting, oiling and rubbing would constitute some improvement over the untreated net or cord in one or more of the respects mentioned.

The wax permeated fabric is indicated in the drawings by the reference character 25, and is particularly shown in Figs. 12 and 13, where the dotted lines represent the wax coating and the knots are shown to be flattened. This fabric is mounted upon rectangular sieve frames 26 in any suitable manner, as by engaging the loops or meshes at the edge thereof upon pins or studs 27 projecting from the face of the frame 26, such pins preferably consisting of ordinary nails with flat conical heads, as shown, which will serve to prevent the fabric becoming accidentally disengaged therefrom, but which will not interfere with the removal of the fabric when desired. The pins or studs 27 may be positioned as desired on the frame and the fabric may have its meshes open more or less by approaching or departing from the rectangular shape by pulling at the opposite edges of the fabric before it is secured to the frame, the studs or pins 27 being positioned accordingly so as to constitute a means for maintaining the mesh of the fabric in a predetermined shape while supporting it.

The sifting drum 22 comprises the roller supported and chain driven end rings as usual with the screen frames occupying the space between them with lifting ribs within the drum extending from one ring to the other along the angle formed between the adjacent screen frames. The drum frame or skeleton is made by the end rings connected together by thin metal strips 28 with their edges beveled outwardly, and the screen frames 26 are held in place with their edges fitting against the beveled edges of the strips 28 by means of bolts 29 passing through the strips 28 and carrying washers 30 for engaging the edges of the two adjacent screen frames. Some, or all of these bolts 29 may be made sufficiently long to extend through the lifting rib, or the lifting rib may be mounted on the strips 28 by separate bolts. The lifting rib may be of any suitable type, but I have illustrated a form in which two or more rods or bars 31 are mounted on the bolts 29 with spacers 32 therebetween so that they lie parallel and spaced apart extending longitudinally of the drum from one end thereof to the other. These lifting ribs are in the nature of longitudinally slotted shelves in the corners of the hexagonal sieve drum with their longitudinal slots or spaces or openings between the respective rods and between the outer rod and the wall of the drum which is considered to consist of the screen fabric and the strips 28. It is through these spaces or openings that the loose peas are free to escape from the masses of vines resting on the lifting ribs so as to more quickly find their way out of the drum and avoid being thrown into the range of the hulling beaters. The innermost rod 31 of each lifting rib is preferably connected at its ends directly to the rings of the drum by means of a suitable bracket connection 33, and though the outer rods are preferably square in cross section and so arranged that the bolts 29 pass diagonally therethrough, the inner rods may have their inner edges square across the rib, or they may be round and of tubular construction, as shown in Figs. 6 and 7, but they are preferably provided with a sheet rubber covering 34 which, if not entirely surrounding them, at least covers their inner surfaces and their rear surfaces against which the vines may be thrown or slashed by the operation of the beaters. These rubber coverings may also cover the connecting brackets 33 for the same purpose. The rubber covering may be fastened in place on the inner rod of each lifting rib and is preferably larger than the surface covered by it so as to form a yielding cushioning surface with air space between it and the rod. When thus protected the lifting ribs are not apt to injure the peas even though vines may be caught upon the hulling beaters and slashed against the lifting ribs in the rapid rotary movement of the inner drum, but such action will materially facilitate the opening of the pods to liberate the peas without injuring them.

The inclined separating apron 24 beneath the sifting drum travels upwardly over an angular drum 35 which gives it a shaking motion to cause the round peas to roll down, though dirt and chaff of which there is a large amount, especially in wet weather, adheres to the apron and is carried upwardly therewith to be dropped therefrom when the apron passes around the angular drum. It is found that much of the dirt and chaff will continue to adhere to the apron even after it passes around the angular drum and that it is necessary to provide means for positively removing it, as otherwise it interferes with the downward travel of the peas on the ascending portion of the apron and the peas are thereby carried by the apron over the angular drum and are wasted.

I provide a rotary brush for cleaning the surface of the apron on its return travel, such brush being adjustable with relation to the apron so as to bear thereon with greater or less pressure according to the varying requirements and so that the brush may be entirely freed from its contact with the apron in dry weather when its action is not required.

Arms 36 are pivotally mounted on the longitudinal base beam of the frame 20 near both ends of the machine on the side thereof at which the inclined apron 24 is more elevated, and secured to the upper end of each of said arms is a casting 37 having an arc-shaped projection centered on the pivotal connection of the arms and slidably mounted in a guide housing 38 secured to the inner face of the corner upright of the frame. Rack teeth 39 are formed in the arc-shaped projection of each casting 37 and are engaged by the teeth of a pinion 40 mounted in the housing 38 and connected with a handle 41 so that the turning of the handle causes the pinion to force the arm 36 to swing on its pivotal connection. A clamping screw 42 on the casting 37 travels in a slot of the housing 38 and when tightened locks the parts in their adjusted position. A shaft 43 is loosely mounted in flanged bearing sleeves 44 which contain open oil cups 45 integral therewith at the upper part thereof, and these sleeves with their oil cups fit loosely in correspondingly shaped openings in the castings 37 near the ends of the arms 36 and are capable of a limited degree of play therein to permit of independent movement of either of the arms 36 without binding the shaft 43 in its bearings. Spider frames are secured to the shaft 43 near its bearings and consist of a number of radial arms 46 with their ends shaped to fit longitudinally extending angle iron brush holders 47 which are bolted to the corresponding arms of the two spider frames. Brush members 48 are each formed of a long strip of parallel transversely arranged bristles bound together preferably by two lines of stitching 49 near their middle portion so as to leave both edges available for use, and each is secured to the brush holder 47 with one edge thereof fitting within the angle of the brush holder and with the ends of the bristles abutting the flange of the angle iron, and is clamped rigidly in place by means of a channel iron clamping member 50 which is bolted through the brush member to the brush holder 47. On one end of the shaft 43 is a sprocket wheel 51 which is connected by a chain 52 with a sprocket wheel 53 on the shaft carrying the triangular drum of the separating apron 24 so that the means for driving the separator apron also serves to rotate the apron cleaning brush. If it is desired that the apron cleaning brush yield with the up and down movements of the separating apron 24, due to the triangular shape of its drum 35, the clamping screws 42 may be loosened so that the arms 36 are free to swing, and the brush is then held in contact with the separating apron by spring pressure. For this purpose a coil spring 54 is provided at each end of the cleaning brush and is engaged at one end with a hook 55 on the casting 37 and at the other end with a hook rod 56 which is slidably mounted in a lug 57 of the housing 38 where it is held in its adjustments by a set screw 58. By changing the adjustment of the hook rod 56 the tension of spring 54 may be changed to cause the rotary brush to bear against the apron with the desired pressure at each end, and by means thereof a greater pressure may be applied at one end of the brush than at the other, as a more vigorous cleaning is required at that edge of the apron which is near the feed end of the machine.

The casting 37 at the end of the machine at which the driving connection for the cleaning brush is made has a bracket extension 59 in the end of which is an arc-shaped slot 60 limiting the travel of a clamping screw 61 which passes therethrough and is threaded in a chain tightener arm 62. The chain tightener arm 62 projects from a collar 63 which loosely fits around the bearing sleeve 44 and is held in place thereon by a lug 64 projecting from the bearing sleeve. The collar 63 has a notch 65 to pass over the lug 64 when the collar is placed on the sleeve, but in the position of the arm 62 as limited by the travel of clamping screw 61 in slot 60 the notch 65 is out of position to receive the lug 64, and the collar is, therefore, held in place by the lug. On the end of the arm 62 is a sprocket wheel 66 engaging the chain 52 to prevent undue slack in the chain during the adjustments and movements of the arm 36, and the position of the sprocket wheel 66 for this purpose may be adjusted by the swinging of the arm 62 and it may be held in its adjustments by the tightening of clamping screw 61.

The rotary brush for cleaning the separating apron 24 on the return or downward travel thereof is thus driven in a direction to have the brush members sweep against the apron with an opposite direction of movement so as to be most effective for thoroughly brushing the adhering matter from the apron, and the swinging movements of the arms 36 permit the springs 54 to hold the brush in contact with the apron notwithstanding the up and down movements thereof, while the rack and pinion adjustment enables the brush to be fixed in position when desired, either in contact with the apron or removed therefrom, such adjustments being retained by tightening the clamping screws 42. As the brush members may wear at one end faster than at the other they are so constructed as to be reversible end to end to equalize such wear and when one edge has become worn they may be reversed so that their unworn inner edge becomes effective, thus prolonging the life thereof and permitting the brush members to be used until entirely worn away.

The lifting ribs composed of longitudinally arranged bars rectangular in cross section and spaced apart with their angular edges opposed provide the slots between the rods with tapering walls on both sides of the ribs to facilitate the passage of loose peas therethrough while holding the unopened pods and the vines. The same is true of the spaces between the outer rods and the longitudinal strips 28. In this respect these lifting ribs resemble the lifting ribs covered in my Patent No. 1,153,304, where radially positioned parallel fingers or spacing members connect a single rod or bar with the wall of the drum with spaces between them through which the loose peas pass. The present construction, however, is of fewer parts and is consequently stronger and less expensive to manufacture, but its most important difference is the fact that the spaces instead of being short and radial to the drum are long and longitudinally positioned with relation to the drum, thus facilitating the cleaning of mud and dirt therefrom when operating in wet weather, such accumulations adhering to the parts of the lifting rib being more easily dislodged with a broom or the like from the few long horizontal openings than from the numerous short vertical openings.

The lifting rib formed of spaced parallel rods with longitudinal openings next to the wall of the drum and others more or less distant from the wall of the drum, provides the slot for draining peas from the bottom of the pocket formed between the rib and the drum wall under all conditions. With a single slot construction the mud and dirt clinging to the wall of the drum in wet weather soon closes the slot and renders it ineffective for releasing loose peas, but with the series of slots, the next slot becomes effective for that purpose when the outer slot is obstructed in this manner and the draining of loose peas from the troughs or pockets continues. The fillet formed by the accumulated matter in effect raises the bottom of the pocket to the level of the next higher slot and the parallel slots continue to function after the single slot construction would become useless for draining loose peas. Also the lifting rib of this invention provides numerous slats on which the pea pods may be thrown with violence by the beaters for causing them to open, the bending of the pods over the edges of the slats serving the purpose of opening them to liberate the peas. The angular surfaces of the rods forming the lifting ribs assures the pods striking thereagainst with glancing blows which are more effective for opening them without injuring the peas.

Figs. 23 and 24 are an end view and a plan view respectively of a modified form of rotary brush for cleaning the separating apron in which rubber or leather strips are employed instead of the bristle brushes;

Fig. 25 is a sectional detail view of the brush member thereof;

Fig. 26 is a similar view of a further modification in which a wooden scraper constitutes the brush member;

Figs. 27 and 28 are plan and sectional views respectively of a modification of the net for the screening surface of the sifting drum in which the cords are secured by metal fastening means instead of being knotted together; and Figs. 29 and 30 are plan and sectional views respectively of a further modification in which the cords forming the net are not interwoven, but lie in two separate planes, the cords running in one direction lying in one plane and the cords running in the other direction lying in the other plane and the two sets of cords being tied together by flexible fastening means passing through them.

It is found that the brush members of the rotary brush for cleaning the separating apron may be made of strips 48' of rubber or leather or the like material such as strips of belting substituted for the strips of bristles or brush fibers of the first described construction and the separating apron will be effectively cleaned thereby and their wearing surfaces may be renewed in the same manner by reversing them in their holders. It is also found that wooden strips 48'' may be substituted and because of the flexibility of the apron their operation will be efficient, but especially when the outer edge is beveled as shown in Fig. 26.

For convenience of description, however, these scrapers whether yielding or rigid, will be referred to as brushes as they serve to brush the adhering matter from the surface of the separating apron.

-The netting for the screening surface of the sifting drum instead of being knotted at the corners of the meshes may be otherwise connected as by means of tacks 25' driven through the crossing threads and preferably embedded therein by pressure with their ends turned over as shown in Fig. 28 to firmly secure the cords together without forming projections which would be liable to injure the peas.

A form of netting for a screening surface which possesses meritorious features in that shown in Figs. 29 and 30 wherein the parallel cords extending in one direction are all located in one plane on each screen frame while those extending in the other direction are located in a different plane, but the two sets of cords being in contact with each other and being secured together at their crossing points by flexible tying means 25'' preferably consisting of smaller cords passing diametrically through the cords of the netting 25 and then being wrapped around the respective cords of the netting and having their ends tied together in the manner shown in Fig. 30. With this construction there is no warping of either set of cords and they may be permanently tensioned as desired, preferably the cords on the inside of the screening surface extending in the direction of the turning of the drum so that vines or grass may not adhere thereto and obstruct the passage of the liberated peas through the meshes of the netting.

The view shown in Fig. 29 is taken from the outside of the screen where the knots are located and likewise in Fig. 30 the inside smooth surface of the fabric is at the lower part thereof. These knots are located on the outside of the fabric in order to avoid the formation of projections which might engage with the vines or with grass contained in the drum with the vines, the object being to keep the inner surface of the screen as smooth as possible.

What I claim as new, and desire to secure by Letters Patent is:

1. In a green pea vine huller, an angular inner drum, hulling beaters secured to the inner drum along the angles thereof having flat outer portions approximately parallel with one of the adjacent faces of the angular inner drum, and a deep, sweeping, curved connecting portion merging with said flat outer portion and with the other adjacent face of the angular inner drum to deflect material forwardly and outwardly after being struck by the flat outer portion.

2. In a pea separator sifting drum, a lifting rib comprising longitudinally extending parallel rods spaced from each other and from the wall of the drum.

3. In a pea separator sifting drum, longitudinal strips forming a part of the frame of the drum, screen frames secured to the longitudinal strips, lifting ribs comprising parallel rods extending longitudinally of the drum, bolts passing through the rods of the lifting rib and the longitudinal strips, and spacers between the rods and the longitudinal strips for holding them in parallel relation.

4. In a pea separator sifting drum, lifting ribs comprising longitudinally extending parallel spaced rods, and a covering of cushioning material on the innermost rod of each lifting rib with an air space therebetween.

5. In a pea separator, an inner rotary drum having hulling beaters thereon, an outer sifting drum rotating in the same direction as the inner drum but at a slower speed, and lifting ribs in the outer drum having their inner edges covered with a soft cushioning material with an air space therebetween.

6. In a pea huller, an inner rotating drum, hulling beaters thereon, an outer rotating sifting drum turning in the same direction but at a slower speed, lifting ribs in the outer drum, and a protective covering of soft yielding material on the inner and rear edges of the lifting ribs.

7. In a pea separator sifting drum, a lifting rib comprising longitudinally arranged parallel rods angular in cross section and spaced apart with their angular edges opposed so that the space between them is formed between converging surfaces on either side of the lifting rib.

8. In a green pea vine huller, an angular inner drum, hulling beaters secured to the inner drum along the angles thereof having flat outer portions approximately parallel with one of the adjacent faces of the angular inner drum and a deep sweeping curved connection portion merging with said flat outer portion to deflect material forwardly and outwardly after being struck by the flat outer portion.

In testimony whereof, I affix my signature, in presence of two witnesses.

FRANK HAMACHEK.

Witnesses:
R. S. C. CALDWELL,
T. M. BLANCHARD.